(12) United States Patent
Shimazawa et al.

(10) Patent No.: US 7,940,486 B2
(45) Date of Patent: May 10, 2011

(54) THERMALLY ASSISTED MAGNETIC HEAD, HEAD GIMBAL ASSEMBLY, AND HARD DISK DRIVE

(75) Inventors: Koji Shimazawa, Tokyo (JP); Kosuke Tanaka, Tokyo (JP); Takaaki Domon, Tokyo (JP)

(73) Assignee: TDK Corporation, Tokyo (JP)

( * ) Notice: Subject to any disclaimer, the term of this patent is extended or adjusted under 35 U.S.C. 154(b) by 885 days.

(21) Appl. No.: 11/892,882

(22) Filed: Aug. 28, 2007

(65) Prior Publication Data

US 2008/0055762 A1 Mar. 6, 2008

(30) Foreign Application Priority Data

Aug. 31, 2006 (JP) ................ P2006-236497

(51) Int. Cl.
*G11B 11/105* (2006.01)
*G11B 11/10* (2006.01)
*G11B 5/02* (2006.01)
*G11B 7/135* (2006.01)
*G11B 7/125* (2006.01)

(52) U.S. Cl. .............. 360/59; 369/13.32; 369/112.27

(58) Field of Classification Search ............ 360/59; 369/13.13, 13.32, 13.33, 112.01, 112.09, 369/112.14, 112.21, 112.27

See application file for complete search history.

(56) References Cited

U.S. PATENT DOCUMENTS

| | | | | |
|---|---|---|---|---|
| 5,199,090 A * | 3/1993 | Bell | ................ | 385/33 |
| 5,353,268 A | 10/1994 | Hintz | | |
| 6,768,556 B1 * | 7/2004 | Matsumoto et al. | ........ | 356/601 |
| 6,795,380 B2 * | 9/2004 | Akiyama et al. | ........ | 369/13.33 |
| 6,795,630 B2 | 9/2004 | Challener et al. | | |
| 6,876,604 B2 * | 4/2005 | Ueyanagi | .......... | 369/13.23 |
| 7,133,230 B2 | 11/2006 | Saga et al. | | |
| 7,518,815 B2 * | 4/2009 | Rottmayer et al. | ......... | 360/59 |
| 7,538,978 B2 * | 5/2009 | Sato et al. | ........... | 360/128 |
| 2003/0198146 A1 * | 10/2003 | Rottmayer et al. | ....... | 369/13.13 |
| 2004/0197119 A1 | 10/2004 | Matsumoto et al. | | |

(Continued)

FOREIGN PATENT DOCUMENTS

JP    A 6-500194    1/1994

(Continued)

OTHER PUBLICATIONS

Miyanishi, S., et al. "Near-Field Assisted Magnetic Recording," *IEEE Transaction on Magnetics*, vol. 41, No. 10, pp. 2817-2821 (2005).

(Continued)

*Primary Examiner* — William J Klimowicz
(74) *Attorney, Agent, or Firm* — Oliff & Berridge, PLC

(57) ABSTRACT

A laser diode is fixed to a light source support substrate and a first surface of a slider substrate is fixed to a second surface of the light source support substrate; therefore, the slider substrate and the laser diode are kept in a fixed positional relation. Since the laser diode faces a light entrance face of a core, long-distance propagation of light as in the conventional technology does not occur, and light emitted from a light emitting element is guided well to a medium-facing surface while permitting some mounting error and coupling loss of light. A spot size w of a light intensity distribution along the X-axis in the XY plane including an incident-light centroid position on the light entrance face is set larger than a thickness of the core, whereby variation in incidence efficiency is well suppressed against positional deviation.

7 Claims, 9 Drawing Sheets

U.S. PATENT DOCUMENTS

| | | | |
|---|---|---|---|
| 2005/0018547 A1* | 1/2005 | Akiyama et al. | 369/13.02 |
| 2005/0069178 A1 | 3/2005 | Nysaether et al. | |
| 2006/0187564 A1* | 8/2006 | Sato et al. | 360/59 |
| 2007/0041119 A1* | 2/2007 | Matsumoto et al. | 360/59 |
| 2007/0153417 A1* | 7/2007 | Suh et al. | 360/125 |
| 2007/0165495 A1* | 7/2007 | Lee et al. | 369/13.33 |

FOREIGN PATENT DOCUMENTS

| | | |
|---|---|---|
| JP | A 10-162444 | 6/1998 |
| JP | A 2000-173093 | 6/2000 |
| JP | A 2001-255254 | 9/2001 |
| JP | A 2001-283404 | 10/2001 |
| JP | A 2001-325756 | 11/2001 |
| JP | A 2002-512725 | 4/2002 |
| JP | A 2002-298302 | 10/2002 |
| JP | A 2004-158067 | 6/2004 |
| JP | A 2004-303299 | 10/2004 |
| JP | A 2005-511176 | 4/2005 |
| WO | WO 92/02931 A1 | 2/1992 |
| WO | WO 98/09284 A1 | 3/1998 |
| WO | WO 99/53482 A1 | 10/1999 |

OTHER PUBLICATIONS

Shono, K., et al. "Review of Thermally Assisted Magnetic Recording," *Journal of the Magnetics Society of Japan*, vol. 29, No. 1, pp. 5-13 (2005).

* cited by examiner

| DISPLACEMENT X (μm) | SEPARATION DISTANCE Z (μm) | | | | | | | | | | | | | | | | | |
|---|---|---|---|---|---|---|---|---|---|---|---|---|---|---|---|---|---|---|
| | 2 | | 4 | | 6 | | 8 | | 10 | | 12 | | 14 | | 16 | | 18 | |
| | w(μm) | | | | | | | | | | | | | | | | | |
| | 0.499 | | 0.997 | | 1.496 | | 1.995 | | 2.493 | | 2.992 | | 3.491 | | 3.989 | | 4.488 | |
| | INCIDENCE EFFICIENCY(%) / RELATIVE LOSS(%) | | | | | | | | | | | | | | | | | |
| 0 | 100.0 | 0 | 99.8 | 0 | 95.9 | 0 | 88.1 | 0 | 79.2 | 0 | 69.2 | 0 | 63.2 | 0 | 56.4 | 0 | 52.8 | 0 |
| 0.5 | 100.0 | 0 | 98.1 | Δ1.70 | 91.7 | Δ4.38 | 83.1 | Δ5.67 | 75.2 | Δ5.05 | 68.5 | Δ1.01 | 61.5 | Δ2.69 | 55.5 | Δ1.60 | 50.3 | Δ4.73 |
| 1 | 98.1 | Δ1.9 | 85.3 | Δ14.5 | 77.3 | Δ19.4 | 70.9 | Δ19.5 | 65.1 | Δ17.8 | 60.2 | Δ13.0 | 55.0 | Δ13.0 | 52.0 | Δ7.80 | 47.3 | Δ10.4 |
| 1.5 | 51.2 | Δ48.8 | 51.2 | Δ48.7 | 53.6 | Δ44.1 | 51.1 | Δ42.0 | 52.8 | Δ33.3 | 51.4 | Δ25.7 | 46.8 | Δ25.9 | 44.9 | Δ20.4 | 42.4 | Δ19.7 |
| 2 | 2.6 | Δ97.4 | 17.6 | Δ82.3 | 26.4 | Δ72.5 | 32.6 | Δ63.0 | 36.8 | Δ53.5 | 38.3 | Δ44.7 | 39.5 | Δ37.5 | 37.8 | Δ33.0 | 37.7 | Δ28.6 |
| 2.5 | 0.0 | Δ100 | 2.6 | Δ97.4 | 9.8 | Δ89.8 | 17.6 | Δ80.0 | 22.6 | Δ71.5 | 26.1 | Δ62.3 | 29.5 | Δ53.3 | 30.4 | Δ46.1 | 31.0 | Δ41.3 |
| 3 | 0.0 | Δ100 | 0.1 | Δ99.9 | 2.6 | Δ97.2 | 7.1 | Δ91.9 | 12.1 | Δ84.7 | 17.5 | Δ74.7 | 20.4 | Δ67.7 | 23.3 | Δ58.7 | 24.0 | Δ54.5 |

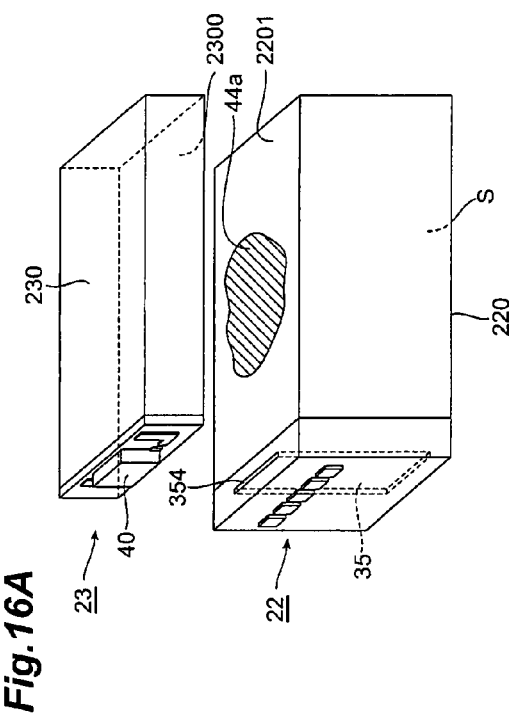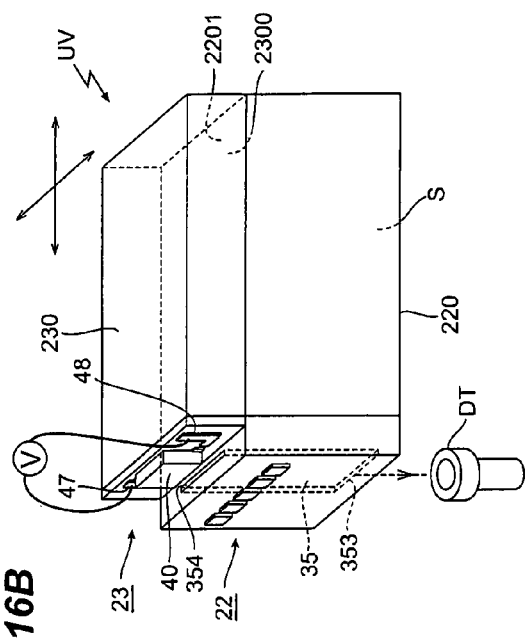
Fig.16A
Fig.16B
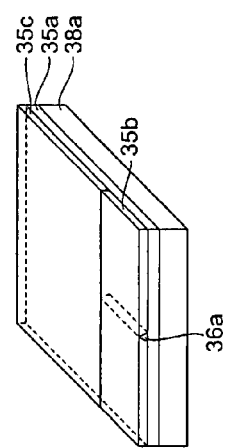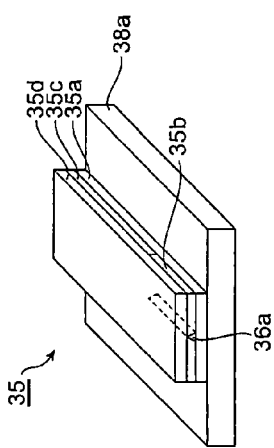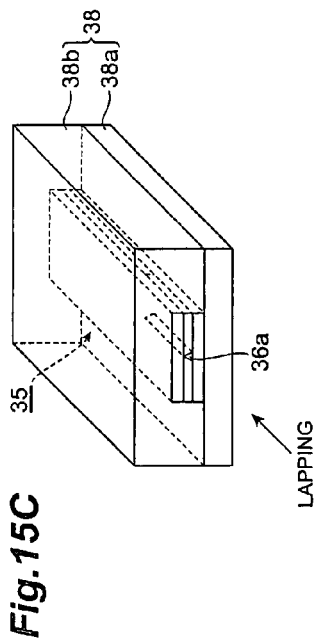
Fig.15A
Fig.15B
Fig.15C

THERMALLY ASSISTED MAGNETIC HEAD, HEAD GIMBAL ASSEMBLY, AND HARD DISK DRIVE

BACKGROUND OF THE INVENTION

1. Field of the Invention

The present invention relates to a thermally assisted magnetic head for writing of signals by thermally assisted magnetic recording and to a head gimbal assembly (HGA) with this thermally assisted magnetic head, and a hard disk drive with this HGA.

2. Related Background Art

As the recording density of the hard disk drive increases, further improvement is demanded in the performance of the thin film magnetic head. The thin film magnetic head commonly used is a composite type thin film magnetic head of a structure in which a magnetic detecting element such as a magneto-resistive (MR) effect element and a magnetic recording element such as an electromagnetic coil element are stacked, and these elements are used to read and write data signals from and into a magnetic disk as a magnetic recording medium.

In general, the magnetic recording medium is a kind of a discontinuous body of fine magnetic particles aggregated, and each of the fine magnetic particles is made in a single magnetic domain structure. A recording bit is composed of a plurality of fine magnetic particles. Therefore, in order to increase the recording density, it is necessary to decrease the size of the fine magnetic particles and thereby decrease unevenness at borders of recording bits. However, the decrease in the size of the fine magnetic particles raises the problem of degradation of thermostability of magnetization due to decrease of volume.

A measure of the thermostability of magnetization is given by $K_U V/k_B T$. In this case, $K_U$ represents the magnetic anisotropy energy of the fine magnetic particles, V the volume of one magnetic particle, $k_B$ the Boltzmann constant, and T absolute temperature. The decrease in the size of fine magnetic particles is nothing but decrease in V, and, without any countermeasures, the decrease in V will lead to decrease of $K_U V/k_B T$ and degradation of the thermostability. A conceivable countermeasure to this problem is to increase $K_U$ at the same time, but this increase of $K_U$ will lead to increase in the coercive force of the recording medium. In contrast to it, the intensity of the writing magnetic field by the magnetic head is virtually determined by the saturation magnetic flux density of a soft magnetic material making the magnetic poles in the head. Therefore, the writing becomes infeasible if the coercive force exceeds a tolerance determined from this limit of writing magnetic field intensity.

As a method of solving this problem of thermostability of magnetization there is the following proposal of so-called thermally assisted magnetic recording: while a magnetic material with large $K_U$ is used, heat is applied to the recording medium immediately before application of the writing magnetic field, to decrease the coercive force, and writing is performed in that state. This according is generally classified under magnetic dominant recording and optical dominant recording. In the magnetic dominant recording, the dominant of writing is an electromagnetic coil element and the radiation diameter of light is larger than the track width (recording width). On the other hand, in the optical dominant recording, the dominant of writing is a light radiating portion and the radiation diameter of light is approximately equal to the track width (recording width). Namely, the magnetic field determines the spatial resolution in the magnetic dominant recording, whereas the light determines the spatial resolution in the optical dominant recording.

Patent Documents 1-7 and Non-patent Document 1 disclose the thermally assisted magnetic head recording apparatus of this type, in the structure in which a light source such as a semiconductor laser is located at a position apart from a slider with a magnetic recording element for generating a magnetic field and in which light from this light source is guided through an optical fiber, a lens, etc. to a medium-facing surface of the slider.

Furthermore, Patent Documents 8-11 and Non-patent Document 2 disclose the thermally assisted magnetic head in which the magnetic recording element and the light source are integrated on a side surface of the slider, and the thermally assisted magnetic head in which the magnetic recording element and the light source are integrated on the medium-facing surface of the slider.

Studies have also been conducted on the magnetic heads using SIL (Solid Immersion Lens) being a high-efficiency condenser element or a plasmon probe being a near-field light generating element. Patent Document 12 discloses an apparatus with the plasmon probe at the tip of a planar waveguide.

(Patent Document 1) International Publication WO92/02931 (JP-A 6-500194)
(Patent Document 2) International Publication WO98/09284 (JP-A 2002-511176)
(Patent Document 3) Japanese Patent Application Laid-Open No. 10-162444
(Patent Document 4) International Publication WO99/53482 (JP-A 2002-512725)
(Patent Document 5) Japanese Patent Application Laid-Open No. 2000-173093
(Patent Document 6) Japanese Patent Application Laid-Open No. 2002-298302
(Patent Document 7) Japanese Patent Application Laid-Open No. 2001-255254
(Patent Document 8) Japanese Patent Application Laid-Open No. 2001-283404
(Patent Document 9) Japanese Patent Application Laid-Open No. 2001-325756
(Patent Document 10) Japanese Patent Application Laid-Open No. 2004-158067
(Patent Document 11) Japanese Patent Application Laid-Open No. 2004-303299
(Patent Document 12) U.S. Pat. No. 6,795,630
(Non-patent Document 1) Shintaro Miyanishi et al., "Near-field Assisted Magnetic Recording" IEEE TRANSACTIONS ON MAGNETICS, 2005, Vol. 41, No. 10, pp 2817-2821
(Non-patent Document 2) Keiji Shono and Mitsumasa Oshiki "Status and Problems of Thermally Assisted Magnetic Recording" Journal of the Magnetics Society of Japan, 2005, Vol. 29, No. 1, pp 5-13

SUMMARY OF THE INVENTION

However, when the light source is located at the place far from the slider, the optical fiber, lens, mirror, etc. have to be used over a long distance for guiding light, which poses a problem of large reduction in efficiency of propagation of light. The efficiency of propagation of light can be improved if the light emitting element is located right above the slider and the slider is provided with a waveguide to guide incident light to the medium-facing surface. However, if there occurs a lateral shift between the optical axis of the light from the light emitting element and the optical axis on a light entrance face of the waveguide, the output of light emerging from the waveguide will vary largely, to cause a problem of large variation in characteristics among products.

The present invention has been accomplished in view of this problem, and an object of the present invention is to provide a thermally assisted magnetic head capable of reducing the characteristic variation among products, an HGA with this thermally assisted magnetic head, and a hard disk drive with this HGA.

In order to solve the aforementioned problem, a thermally assisted magnetic head according to the present invention is a thermally assisted magnetic head comprising: a slider substrate having a medium-facing surface, a first surface located opposite to the medium-facing surface, and side surfaces located between the medium-facing surface and the first surface; a magnetic head portion having a core of a planar waveguide with a light exit face on the medium-facing surface side, and a magnetic recording element located in proximity to the light exit face, the magnetic head portion being fixed to one of the side surfaces; a light source support substrate having a second surface fixed to the first surface; and a light emitting element opposed to a light entrance face of the core and fixed to the light source support substrate; wherein, where a thickness direction, a width direction, and a longitudinal direction of the core are defined as an X-axis, a Y-axis, and a Z-axis, respectively, where α is defined as a beam angle in the XY plane of a far field pattern of light emitted from the light emitting element, where $Z_o$ is defined as a distance between a center of the light entrance surface and a light emitting surface of the light emitting element, and where T is defined as a thickness of the core, the light emitted along the Z-axis from the light emitting element is incident to the light entrance face, and a spot size $w=2 \times Z_o \tan(\alpha/2)$ of a light intensity distribution along the X-axis in the XY plane including an incident-light centroid position on the light entrance face is larger than the thickness T of the core.

Since the light emitting element is fixed to the light source support substrate and the first surface of the slider substrate is fixed to the second surface of the light source support substrate, the slider substrate and the light emitting element are kept in a fixed positional relation. Since the light emitting element faces the light entrance face of the core, the light does not propagate over a long distance, different from the conventional technology, and the light emitted from the light emitting element can be guided to the medium-facing surface, while permitting some mounting error and coupling loss of light.

Namely, this thermally assisted magnetic head is so arranged that the light emitted from the light emitting element is incident to the light entrance face of the core of the planar waveguide and that the light emerges from the light exit face provided on the medium-facing surface to irradiate the magnetic recording medium. Therefore, the temperature rises in a recording region of the magnetic recording medium opposed to the medium-facing surface to temporarily lower the coercive force of the recording region. The magnetic recording element is energized during this period of the lowered coercive force to generate a writing magnetic field and thereby to write information in the recording region.

Since the spot size w of the light intensity distribution along the X-axis on the XY plane is larger than the thickness of the core, the intensity of the light incident into the core will not vary so much even if the centroid position of the incident light is slightly shifted in the X-axis direction. Therefore, the variation is small in the intensity of the emerging light to irradiate the magnetic recording medium whereby the characteristic variation can be reduced among products.

The magnetic recording medium can also be heated by directly applying the light from the light emitting element thereto, but the track width of 20 nm or less is expected in the next-generation magnetic recording. It follows that the technology barrier of the diffraction limit of light cannot be broken through without any countermeasures. Specifically, when a blue-violet laser beam with the wavelength of 405 nm is condensed by a lens with the numerical aperture of 0.85, the minimum diameter of focused light is 0.28 μm (=280 nm) at best Namely, it is impossible to narrow down the irradiated light to below the track width.

Preferably, the thermally assisted magnetic head of the present invention further comprises a plasmon probe disposed on the light exit face of the core. When the plasmon probe is disposed on the light exit face of the core, it generates near-field light upon irradiation with the light from the light emitting element. When the plasmon probe is irradiated with light, electrons in metal making up the plasmon probe come to oscillate in a plasma (plasma oscillation) to cause concentration of the electric field at the distal end of the probe. Since a spread of this near-field light is approximately equal to the radius of the distal end of the plasmon probe, we can enjoy a pseudo effect of narrowing down the emerging light to below the diffraction limit if the radius of the distal end is set to below the track width.

Part of incident light leaks to the outside of the light entrance face of the core, and it is not preferred that this leaking light should function as stray light.

For this reason, the thermally assisted magnetic head of the present invention is configured to comprise a cladding disposed around the core; and a metal kept in contact with the cladding. Namely, when the metal is in contact with the cladding, the leaking light is absorbed by the metal.

It is sufficient that the metal be in contact with the cladding, but the thermally assisted magnetic head of the present invention can also be configured so that a helical coil of the magnetic recording element also functions as the metal. Namely, the thermally assisted magnetic head of the present invention is preferably configured as follows: it further comprises a cladding disposed around the core; the magnetic recording element comprises: a helical coil of a metal kept in contact with the cladding and adapted to generate a writing magnetic field; and a main magnetic pole layer extending from a helical center of the coil toward the medium-facing surface. When an electric current is fed to the helical coil, a magnetic field is guided through the main magnetic pole layer to the medium-facing surface to generate the writing magnetic field spreading outwardly from the medium-facing surface. On the other hand, the helical coil is made of the metal and is in contact with the cladding, so that it can also absorb the leaking light.

The light entrance face is preferably inclined relative to the XY plane and in this case, the light reflected on the light entrance face does not return to the light emitting element side, which enables extension of the life of the light emitting element.

An HGA according to the present invention preferably comprises the above-described thermally assisted magnetic head, and a suspension supporting the thermally assisted magnetic head. A hard disk drive according to the present invention preferably comprises the above-described HGA, and a magnetic recording medium facing the HGA.

In the HGA and the hard disk dive with the foregoing thermally assisted magnetic head, the characteristic variation can be reduced among products.

The thermally assisted magnetic head, and the HGA and the hard disk drive with this thermally assisted magnetic head according to the present invention are able to reduce the characteristic variation among products.

BRIEF DESCRIPTION OF THE DRAWINGS

FIGS. 15A, 15B and 15C are perspective views for explaining the embodiment of the method of forming the waveguide 35 and near-field light generator 36.

FIGS. 16A and 16B are perspective views showing a production method of the thermally assisted magnetic head.

DESCRIPTION OF THE PREFERRED EMBODIMENT

Figure 2:
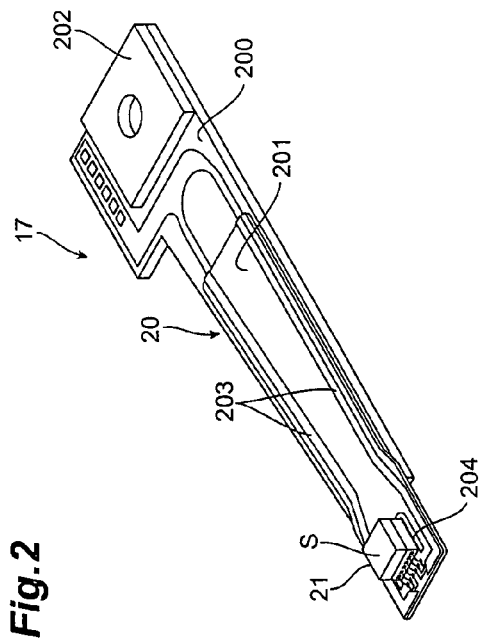
FIG. 2 is a perspective view of an HGA 17.

Embodiments for carrying out the present invention will be described below in detail with reference to the accompanying drawings. In each of the drawings the same elements will be denoted by the same reference numerals. It is also noted that the dimensional ratios in and between the constituent elements in the drawings are arbitrary, for easier understanding of the drawings.
(Hard Disk Drive)

Figure 1:
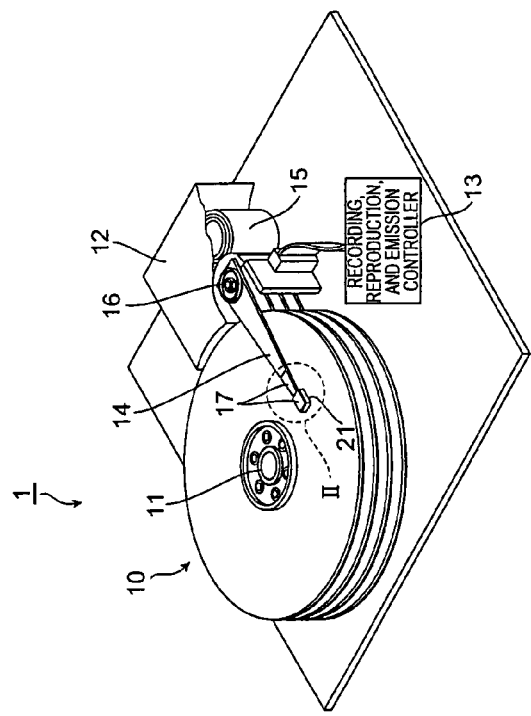
FIG. 1 is a perspective view of a hard disk drive according to an embodiment.

FIG. 1 is a perspective view of a hard disk drive according to an embodiment.

The hard disk drive 1 has magnetic disks 10 consisting of a plurality of magnetic recording media to rotate around a rotation shaft of spindle motor 11, an assembly carriage device 12 for positioning each thermally assisted magnetic head 21 on a track, and a recording, reproduction, and emission control circuit (control circuit) 13 for controlling writing and reading operations of each thermally assisted magnetic head 21 and for controlling a laser diode as a light source for emitting laser light for thermally assisted magnetic recording, which will be detailed later.

The assembly carriage device 12 is provided with a plurality of drive arms 14. These drive arms 14 are angularly rockable around a pivot bearing shaft 16 by voice coil motor (VCM) 15, and are stacked in the direction along this shaft 16. Ahead gimbal assembly (HGA) 17 is attached to the distal end of each drive arm 14. Each HGA 17 is provided with a thermally assisted magnetic head 21 so that it faces the surface of each magnetic disk 10. The surface of the magnetic head 21 facing the surface of the magnetic disk 10 is a medium-facing surface S (which is also called an air bearing surface) of the thermally assisted magnetic head 21. The number of each of magnetic disks 10, drive arms 14, HGAs 17, and thermally assisted magnetic heads 21 may be one.
(HGA)

FIG. 2 is a perspective view of an HGA 17. In the same drawing the medium-facing surfaces of HGA 17 is illustrated up.

The HGA 17 is constructed by fixing the thermally assisted magnetic head 21 to a distal end of suspension 20 and electrically connecting one end of wiring member 203 to terminal electrodes of the thermally assisted magnetic head 21. The suspension 20 is composed mainly of a load beam 200, a flexure 201 with elasticity fixed and supported on this load beam 200, a tongue portion 204 formed in a plate spring shape at the tip of the flexure, a base plate 202 disposed on the base part of the load beam 200, and a wiring member 203 disposed on the flexure 201 and consisting of a lead conductor and connection pads electrically connected to the both ends of the lead conductor.

It is obvious that the structure of the suspension in the HGA 17 is not limited to the above-described structure. An IC chip for driving of the head may be mounted midway in the suspension 20, though not shown.
(Thermally Assisted Magnetic Head)

Figure 3:
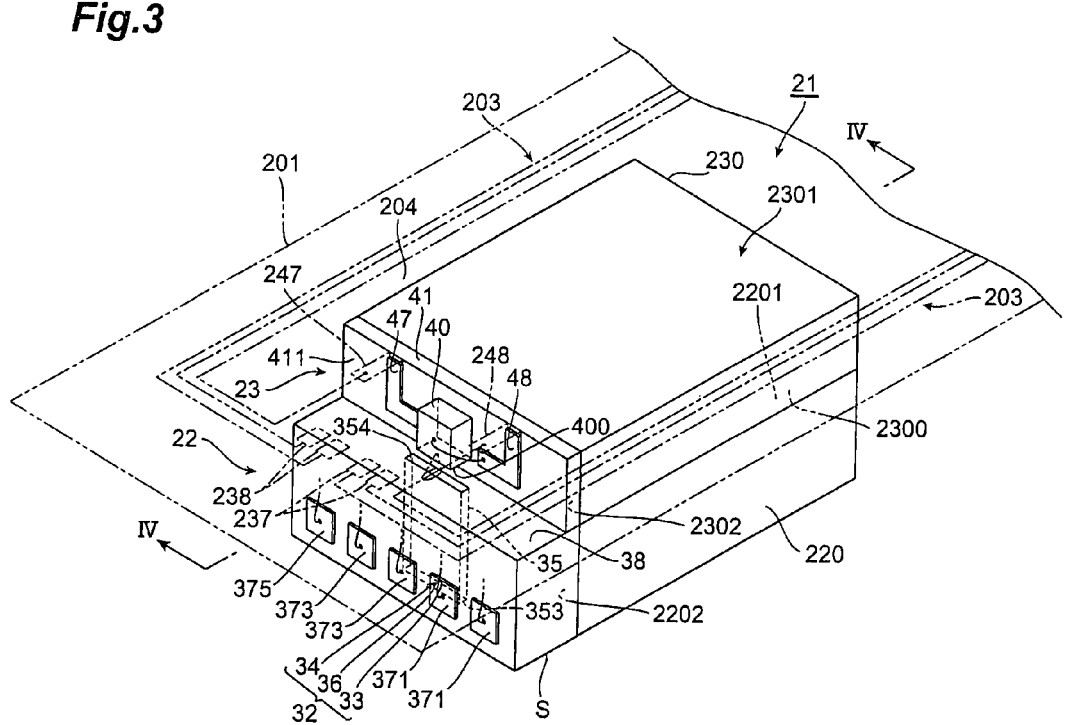
FIG. 3 is an enlarged perspective view of a part near a thermally assisted magnetic head 21 shown in FIG. 1.

FIG. 3 is an enlarged perspective view of a part near the thermally assisted magnetic head 21 shown in FIG. 1.

The wiring member 203 has a pair of electrode pads 237, 237 for recording signal, a pair of electrode pads 238, 238 for readout signal, and a pair of electrode pads 247, 248 for driving of the light source.

The thermally assisted magnetic head 21 has a configuration in which a slider 22, and a light source unit 23 having a light source support substrate 230 and a laser diode 40 as a light source for thermally assisted magnetic recording are bonded and fixed to each other so that a back surface (first surface) 2201 of a slider substrate 220 is in contact with a bond surface (second surface) 2300 of the light source support substrate 230. The back surface 2201 of the slider substrate 220 herein is a surface opposite to the medium-facing surface S of the slider 22. A bottom surface 2301 of the light source support substrate 230 is bonded to the tongue portion 204 of the flexure 201, for example, with an adhesive such as epoxy resin.

The slider 22 has a slider substrate 220, and a magnetic head portion 32 for performing writing and reading of data signal.

The slider substrate 220 is of a plate shape and has the medium-facing surface S processed so as to achieve an appropriate levitation amount. The slider substrate 220 is made of electrically conductive AlTiC ($Al_2O_3$—TiC) or the like.

The magnetic head portion 32 is formed on an integration surface 2202 which is a side surface approximately perpendicular to the medium-facing surface S of the slider substrate 220. The magnetic head portion 32 has an MR effect element 33 as a magnet detecting element for detecting magnetic information, an electromagnetic coil element 34 as a perpendicular (or, possibly, longitudinal) magnetic recording element for writing magnetic information by generation of a magnetic field, a waveguide (core) 35 as a planar waveguide provided through between the MR effect element 33 and the electromagnetic coil element 34, a near-field light generator (plasmon probe) 36 for generating near-field light for heating a recording layer portion of a magnetic disk, and an insulating layer (cladding) 38 formed on the integration surface 2202 so as to cover these MR effect element 33, electromagnetic coil element 34, core 35, and near-field light generator 36.

Furthermore, the magnetic head portion 32 has a pair of electrode pads 371, 371 for signal terminals formed on an exposed surface of the insulating layer 38 and connected respectively to input and output terminals of the MR effect element 33, a pair of electrode pads 373, 373 for signal terminals connected respectively to the two ends of the electromagnetic coil element 34, and an electrode pad 375 for ground electrically connected to the slider substrate 220. The electrode pad 375 electrically connected through a via hole 375a to the slider substrate 220 is connected through a bonding wire to the electrode pad 247 of the flexure 201 and a potential of the slider substrate 220 is controlled, for example, to the ground potential by the electrode pad 247.

Each of the end faces of the MR effect element 33, electromagnetic coil element 34, and near-field light generator 36 is exposed on the medium-facing surface S. The two ends of the laser diode 40 are connected to the electrode pads 47, 48, respectively.

Figure 4:
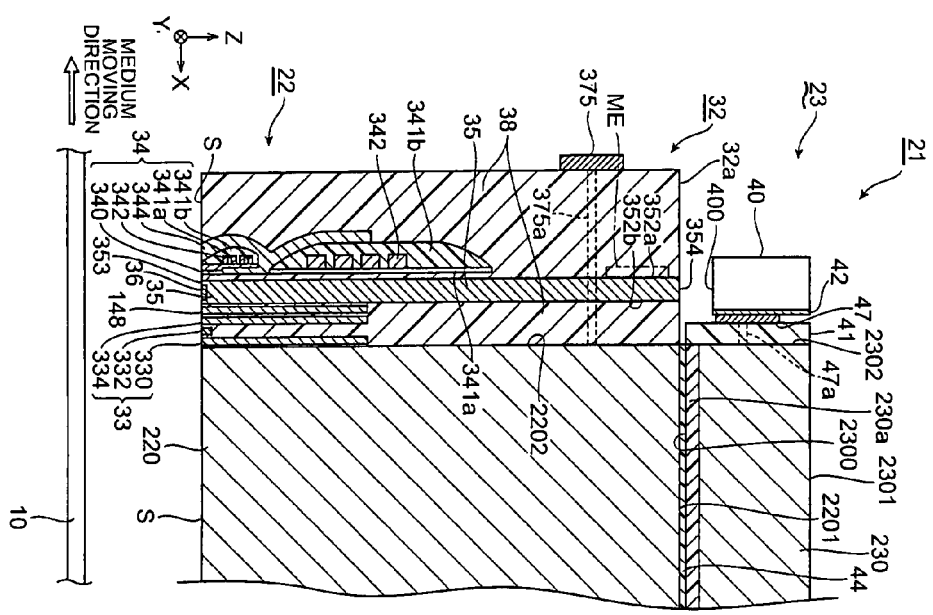
FIG. 4 is a sectional view of the thermally assisted magnetic head 21 shown in FIG. 3, taken along line IV-IV and in the direction of arrows.

FIG. 4 is a sectional view of the thermally assisted magnetic head 21 shown in FIG. 3, taken along line IV-IV and in the direction of arrows.

The MR effect element 33 includes an MR laminate 332, and a lower shield layer 330 and an upper shield-layer 334 located at respective positions on both sides of this MR laminate 332. The lower shield layer 330 and the upper shield layer 334 can be made, for example, of a magnetic material of NiFe, CoFeNi, CoFe, FeN, FeZrN, or the like and in the thickness of about 0.5-3 µm by a pattern plating method including a frame plating method, or the like. The upper and lower shield layers 334 and 330 prevent the MR laminate 332 from being affected by an external magnetic field serving as noise.

The MR laminate 332 includes a magneto-resistance effect film such as an in-plane conduction type (CIP (Current In Plane)) Giant Magneto Resistance (GMR) multilayer film, a perpendicular conduction type (CPP (Current Perpendicular to Plane)) GMR multilayer film, or a Tunnel Magneto Resistance (TMR) multilayer film, and is sensitive to a signal magnetic field from the magnetic disk with very high sensitivity.

For example, when the MR laminate 332 includes a TMR effect multilayer film, it has a structure in which the following layers are stacked in order: an antiferromagnetic layer made of IrMn, PtMn, NiMn, RuRhMn, or the like and in the thickness of about 5-15 nm; a magnetization fixed layer comprised, for example, of CoFe or the like as a ferromagnetic material, or two layers of CoFe or the like with a nonmagnetic metal layer of Ru or the like in between, and having the magnetization direction fixed by the antiferromagnetic layer; a tunnel barrier layer of a nonmagnetic dielectric material made, for example, by oxidizing a metal film of Al, AlCu, or the like about 0.5-1 nm thick by oxygen introduced into a vacuum chamber, or by native oxidation; and a magnetization free layer comprised, for example, of two layered films of CoFe or the like about 1 nm thick as a ferromagnetic material and NiFe or the like about 3-4 nm thick, and affecting tunnel-exchange coupling through the tunnel barrier layer with the magnetization fixed layer.

An interelement shield layer 148 made of the same material as the lower shield layer 330 is formed between the MR effect element 33 and the waveguide 35. The interelement shield layer 148 performs a function of shielding the MR effect element 33 from a magnetic field generated by the electromagnetic coil element 34 and preventing external noise during readout. A backing coil portion may also be further formed between the interelement shield layer 148 and the waveguide 35. The backing coil portion generates a magnetic flux to cancel a magnetic flux loop generated by the electromagnetic coil element 34 and passing via the upper and lower electrode layers of the MR effect element 33, and thereby suppresses the Wide Area Track Erasure (WATE) phenomenon being an unwanted writing or erasing operation on the magnetic disk.

The insulating layer 38 made of alumina or the like is formed between the shield layers 330, 334 on the opposite side to the medium-facing surface S of the MR laminate 332, on the opposite side to the medium-facing surface S of the shield layers 330, 334, 148, between the lower shield layer 330 and the slider substrate 220, and between the interelement shield layer 148 and the waveguide 35.

When the MR laminate 332 includes a CIP-GMR multilayer film, upper and lower shield gap layers for insulation of alumina or the like are provided between each of the upper and lower shield layers 334 and 330, and the MR laminate 332. Furthermore, an MR lead conductor layer for supplying a sense current to the MR laminate 332 to extract reproduction output is formed though not shown. On the other hand, when the MR laminate 332 includes a CPP-GMR multilayer film or a TMR multilayer film, the upper and lower shield layers 334 and 330 also function as upper and lower electrode layers, respectively. In this case, the upper and lower shield gap layers and MR lead conductor layer are unnecessary and omitted.

A hard bias layer HM (cf. FIG. 7) of a ferromagnetic material such as CoTa, CoCrPt, or CoPt, for applying a vertical bias magnetic field for stabilization of magnetic domains, is formed on each of both sides in the track width direction of the MR laminate 332.

The electromagnetic coil element 34 is preferably one for perpendicular magnetic recording and, as shown in FIG. 4, has a main magnetic pole layer 340, a gap layer 341a, a coil insulating layer 341b, a coil layer 342, and an auxiliary magnetic pole layer 344.

The main magnetic pole layer 340 is a magnetic guide for guiding a magnetic flux induced by the coil layer 342, up to the recording layer of the magnetic disk (medium) as a target of writing, while converging the magnetic flux. The end of the main magnetic pole layer 340 on the medium-facing surface S side preferably has a width in the track width direction (depth direction in FIG. 4) and a thickness in the stack direction (horizontal direction in FIG. 4) smaller than those of the other portions. This results in permitting the main magnetic pole layer to generate a fine and strong writing magnetic field adapted for high recording density.

The end portion of the auxiliary magnetic pole layer 344 on the medium-facing surface S side, which is magnetically coupled with the main magnetic pole layer 340, forms a trailing shield portion wider in a layer section than the other portion of the auxiliary magnetic pole layer 344. The auxiliary magnetic pole layer 344 is opposed through the gap layer (cladding) 341a and coil insulating layer 341b made of an insulating material such as alumina, to the end of the main magnetic pole layer 340 on the medium-facing surface S side. When the auxiliary magnetic pole layer 344 of this configuration is provided, the magnetic field gradient becomes steeper between the auxiliary magnetic pole layer 344 and the main magnetic pole layer 340 near the medium facing surface S. This results in decreasing jitter of signal output and permitting decrease in the error rate during readout.

The auxiliary magnetic pole layer 344 is made, for example, in the thickness of about 0.5 to about 5 μm and, for example, of an alloy of two or three out of Ni, Fe, and Co by frame plating, sputtering, or the like, or an alloy containing these as principal ingredients and doped with a predetermined element.

The gap layer 341*a* separates the coil layer 342 from the main magnetic pole layer 340 and is made, for example, in the thickness of about 0.01 to about 0.5 μm and, for example, of $Al_2O_3$ or DLC or the like by sputtering, CVD, or the like.

The coil layer 342 is made, for example, in the thickness of about 0.5 to about 3 μm and, for example, of Cu or the like by frame plating or the like. The rear end of the main magnetic pole layer 340 is coupled with the portion of the auxiliary magnetic pole layer 344 apart from the medium-facing surface S and the coil layer 342 is formed so as to surround this coupling portion.

The coil insulating layer 341*b* separates the coil layer 342 from the auxiliary magnetic-pole layer 344 and is made, for example, in the thickness of about 0.1 to about 5 μm and of an electric insulating material such as thermally cured alumina or resist layer or the like.

Figure 5:
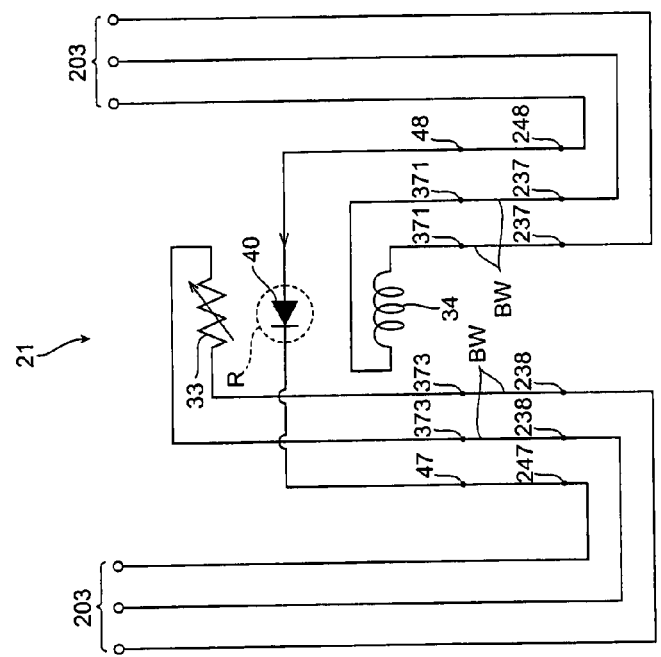
FIG. 5 is a circuit diagram of the thermally assisted magnetic head 21.

FIG. 5 is a circuit diagram of the thermally assisted magnetic head 21.

One of wires forming the wiring member 203 is electrically connected through the electrode pad 247 and electrode pad 47 to the cathode of the laser diode 40, and another wire is electrically connected through the electrode pad 248 and electrode pad 48 to the anode of the laser diode 40. The laser diode 40 emits light with supply of a drive current between the electrode pads 247, 248. This light travels through the core of the planar waveguide and the medium-facing surface S (cf. FIG. 4) to irradiate a recording region R of the magnetic recording medium.

Another pair of wires forming the wiring member 203 are connected through the electrode pads 237, bonding wires BW, and electrode pads 371 to the two ends of the electromagnetic coil element 34. When a voltage is applied between the pair of electrode pads 237, an electric current is fed to the electromagnetic coil element 34 as a magnetic recording element to generate a writing magnetic field. In the thermally assisted magnetic head 21, the light emitted from the laser diode 40 is incident to a light entrance face 354 of the core 35 of the planar waveguide and emerges from a light exit surface thereof provided in the medium-facing surface S to irradiate the recording region R of the magnetic recording medium (cf. FIG. 4). Therefore, the temperature rises in the recording region R of the magnetic recording medium facing the medium-facing surface, to temporarily lower the coercive force of the recording region R. Information can be written in the recording region R when the electromagnetic coil element 34 is energized during this period of the lowered coercive force.

Another pair of wires forming the wiring member 203 are connected through the electrode pads 238, bonding wires BW, and electrode pads 373 to the two ends of the MR effect element 33, respectively. When a voltage is applied between the pair of electrode pads 238, a sense current flows to the MR effect element 33. Information written in the recording region R can be read out with flow of the sense current to the MR effect element 33.

Figure 6:
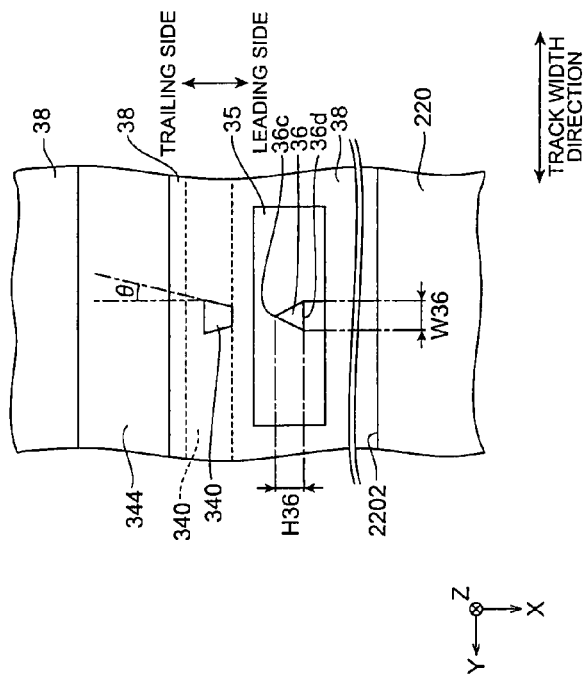
FIG. 6 is a plan view of a major part of the magnetic head as seen from the medium-facing surface side.

FIG. 6 is a plan view of a major part of the magnetic head as seen from the medium-facing surface side.

The tip of the main magnetic pole layer 340 on the medium-facing surface S side is tapered in a shape of such an inverted trapezoid that the length of the side on the leading side or slider substrate 220 side is shorter than the length of the side on the trailing side.

The end face of the main magnetic pole layer 340 on the medium-facing surface side is provided with a bevel angle θ, in order to avoid unwanted writing or the like on an adjacent track by influence of a skew angle made by actuation with a rotary actuator. The magnitude of the bevel angle θ is, for example, approximately 15°. In practice, the writing magnetic field is generated mainly near the longer side on the trailing side and in the case of the magnetic dominant recording, the length of this longer side determines the width of the writing track.

Here the main magnetic pole layer 340 is preferably made, for example, in the total thickness of about 0.01 to about 0.5 μm at the end portion on the medium-facing surface S side and in the total thickness of about 0.5 to about 3.0 μm at the portions other than this end portion and, for example, of an alloy of two or three out of Ni, Fe, and Co by frame plating, sputtering, or the like, or an alloy containing the foregoing elements as main ingredients and doped with a predetermined element The track width can be, for example, 100 nm.

Figure 7:
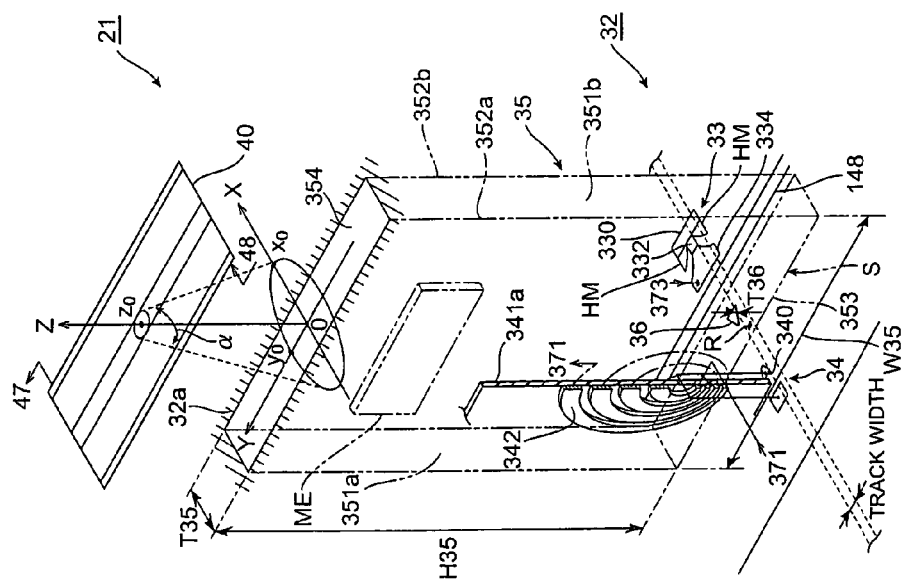
FIG. 7 is a perspective view of a major part of the thermally assisted magnetic head 21.

FIG. 7 is a perspective view of a major part of the thermally assisted magnetic head 21.

When the X-axis is set along the thickness direction of the waveguide (core) 35, the Y-axis direction along the width direction, and the Z-axis direction along the longitudinal direction, the light emitted along the Z-axis from the light emitting surface of the laser diode 40 is incident to the light entrance face 354.

The core 35 is located between the MR effect element 33 and the electromagnetic coil element 34, extends in parallel with the integration surface (YZ plane) 2202 (cf. FIG. 4), extends from the medium-facing surface S of the magnetic head portion 32 to the surface 32*a* opposite to the medium-facing surface S of the magnetic head portion 32, and is of a rectangular plate shape in the present example. The core 35 has two side faces 351*a*, 351*b* both extending from the medium-facing surface S and opposed in the track width direction, and two upper face 352*a* and lower face 352*b* parallel to the integration surface 2202, and the core 35 also has a light exit face 353 forming the medium-facing surface S, and a light entrance face 354 opposite to the light exit face 353. The upper face 352*a*, the lower face 352*b*, and the two side faces 351*a*, 351*b* of the waveguide 35 are in contact with the insulating layer 38 having the refractive index smaller than that of the waveguide 35 and functioning as a cladding for the waveguide 35.

This waveguide 35 is able to guide light incident through the light entrance face 354, to the light exit face 353 as the end face on the medium-facing surface S side, while reflecting the light on the two side faces 351*a*, 351*b*, the upper face 352*a*, and the lower face 352*b*. The width W35 of the core 35 in the track width direction can be, for example, 1-200 μm, the thickness T35, for example, 2-10 μm, and the height H35 10-300 μm.

The core 35 is made, for example, by sputtering or the like, from a dielectric material which has the refractive index n higher than that of the material making the insulating layer 38, everywhere. For example, in a case where the insulating layer 38 as a cladding is made of SiO$_2$ (n=1.5), the core 35 may be made of Al$_2$O$_3$ (n=1.63). Furthermore in a case where the insulating layer 38 is made of Al$_2$O$_3$ (n=1.63), the core 35 may be made of Ta$_2$O$_5$ (n=2.16), Nb$_2$O$_5$ (n=2.33), TiO (n=2.3-2.55), or TiO$_2$ (n=2.3-2.55). When the core 35 is made of one of such materials, the total reflection condition is met at the interface, in addition to the good optical characteristics of the material itself so as to decrease the propagation loss of laser light and increase the efficiency of generation of near-field light.

The near-field light generator 36 is a platelike member disposed nearly in the center of the light exit face 353 of the waveguide 35. The near-field light generator 36 is buried in the light exit face 353 of the waveguide 35 so that the end face thereof is exposed in the medium-facing surface S.

The magnetic recording medium is also heated by direct irradiation with the light from the light emitting element, but the thermally assisted magnetic head 21 of the present invention is provided with the near-field light generator 36 disposed on the light exit face 353 of the core 35. In this case, when irradiated with the light from the laser diode 40, the near-field light generator 36 generates near-field light When the near-field light generator 36 is irradiated with the light, electrons in the metal making the near-field light generator 36 come to oscillate in the plasma to cause concentration of the electric field at the tip thereof. Since the spread of this near-field light is approximately equal to the radius of the distal end of the plasmon probe, where the radius of this distal end is set to not more than the track width, it achieves the pseudo effect of narrowing down the emerging light to below the diffraction limit.

Part of the incident light from the laser diode 40 leaks to the outside of the light entrance face 354 of the core 35, and it is not preferred that this leaking light should function as stray light. Therefore, the thermally assisted magnetic head 21 is configured to have the cladding (insulating layer 38 and gap layer 341a) disposed around the core 35, and a metal in contact with this cladding. Namely, the leaking light is absorbed by the metal when the metal is kept in contact with the cladding. This metal can be a metal layer ME of Cu or the like in direct contact with the insulating layer 38 (cf. FIG. 4), or a coil layer (helical coil) 342 of metal in contact with the insulating layer 38 or with the gap-layer 341a. The coil layer 342 also serves as a layer to generate the writing magnetic field. The cladding is provided around the core 35 and confines incident light in the core.

The main magnetic pole layer 340 extends from the helical center of the coil layer 342 toward the medium-facing surface S. When an electric current is fed to the coil layer 342, a magnetic field is guided through the main magnetic pole layer 340 to the medium-facing surface S to generate the writing magnetic field spreading outwardly from the medium-facing surface S. On the other hand, since the coil layer 342 is made of metal and is in contact with the cladding, it can also absorb the leaking light. In another conceivable configuration, a light shielding film is disposed around the light entrance face 354.

The light entrance face 354 is preferably inclined relative to the XY plane (the light exit face of the laser diode 40) and in this case, the light reflected on the light entrance face 354 does not return to the laser diode 40 side, so that the life of the laser diode 40 can be extended.

The thermally assisted magnetic head 21 described above has the slider substrate 220 having the medium-facing surface S, the first surface 2201 located on the opposite side to the medium-facing surface S, and the side surfaces located between the medium-facing surface and the first surface 2201; the core 35 of the planar waveguide having the light exit face 353 on the medium-facing surface side; the magnetic head portion 32 having the magnetic recording element 34 in proximity to the light exit face 353 and fixed to one of the side surfaces of the slider substrate 220; the light source support substrate 230 fixed to the first surface 2201 and having the second surface 2300; and the light emitting element 40 facing the light entrance face 354 of the core 35 and fixed to the light source support substrate 230 (cf. FIG. 4). The term "proximity" refers to a distance defined as follows: before a recording region of the magnetic recording medium heated by the light exit face 353 returns to its original temperature, the magnetic field from the magnetic recording element 34 can be applied to the heated recording region. The core 35 has the constant thickness in the X-axis direction and a quadrangular XY cross section.

Since the laser diode 40 is fixed to the light source support substrate 230 and the first surface 2201 of the slider substrate 220 is fixed to the second surface 2300 of the light source support substrate 230, the slider substrate 220 and the laser diode 40 are kept in a fixed positional relation. Since the laser diode 40 faces the light entrance face 354 of the core, the long-distance propagation of light as in the conventional technology is avoided, so that the emitted light from the light emitting element can be guided to the medium-facing surface, while permitting some mounting error and coupling loss of light.

A spot size w of a light intensity distribution along the X-axis in the XY plane including a centroid position G of incident light on the light entrance face 354 is set lager than the thickness T35 of the core 35. Namely, the relation of w>T is met by the beam angle α in the XZ plane of the far field pattern of the light emitted from the laser diode 40, the distance $Z_o$ between the center of the light entrance face 354 and the light emitting surface (light emission face) of the laser diode 40, the thickness T (=T35) of the core 35, and the spot size w (=$2 \times Z_o \tan(\alpha/2)$). In this case, variation can be kept small in the intensity of the light incident into the core 35 where the incident-light centroid position G is shifted in the X-axis direction.

Figure 8:
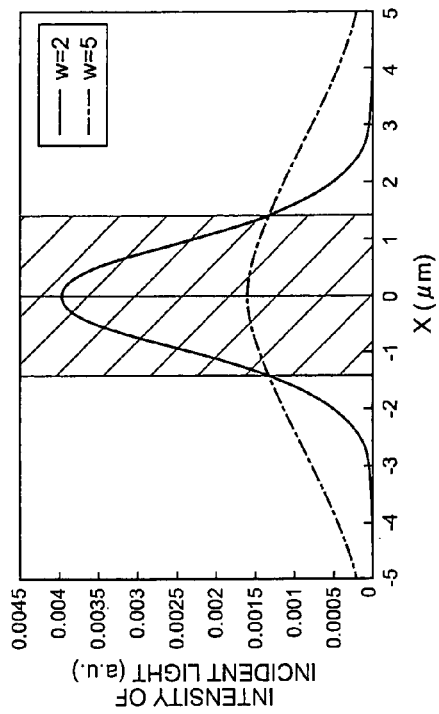
FIG. 8 is a graph showing the relationship of position X (μm) against incident-light intensity (a.u.).

FIG. 8 is a graph showing the relationship of position X (μm) against incident light intensity (a.u.).

The light intensity distribution along the X-axis of the laser light is a Gaussian distribution. When the thickness T35 of the core 35 is 3 μm, most of the light intensity distribution with the spot size w=2 μm resides inside the core 35, but a change in the quantity of incident light is large against positional deviation of incident light. The light intensity distribution with the spot size w=5 μm spreads to the outside of the core 35 as well and a change in intensity against position is relatively flat; therefore, it has an advantage of a small change in the quantity of incident light against positional deviation of incident light Here the spread angle (beam angle) a of the laser light in the thickness direction of the core 35 is 28°.

While the centroid position of the light entrance face 354 was defined as O, we obtained an incidence efficiency (%) to the entrance face 354 against X-directional displacement (μm) of the incident-light centroid position G, a loss (relative loss (%)) of light quantity reduced according to X-displacement at each separation distance Z, and a spot size w (μm) of the incident light intensity distribution, for each separation distance Z (μm) between the light entrance face 354 and the light emission face of the laser diode 40.

Figures 9, 10:
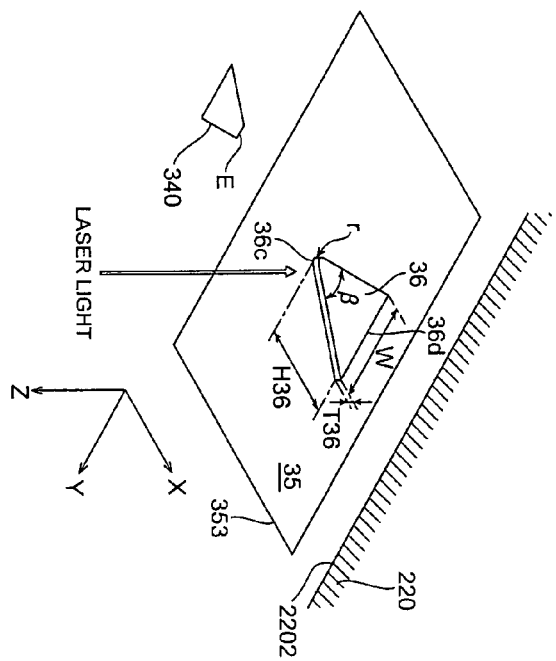
FIG. 9 is a table showing incidence efficiencies (%), relative losses (%), and spot sizes w (μm) against separation distances Z (μm) and X-directional displacements (μm).
FIG. 10 is a perspective view of a near-field light generator (plasmon probe) 36 as seen from the medium-facing surface S.

FIG. 9 is a table showing incidence efficiencies (%), relative losses (%), and spot sizes w (μm) against separation distances Z (μm) and X-directional displacements (μm).

Since the spot size w of the light intensity distribution along the X-axis on the XY plane is larger than the thickness of the core 35, variation does not increase so much in the intensity of the light incident into the core 35 even if the incident-light centroid position G is slightly shifted in the X-axis direction (~2 μm). Particularly, in a case where the separation distance Z (=$Z_o$) is not less than 12 μm nor more than 16 μm and where the displacement X is not more than 2 μm, the decrease of incidence efficiency is not so large and the relative loss against displacement is also well suppressed. Where the thickness of the core 35 is T (=T35), the separation distance $Z_o$ preferably satisfies the relation of $3T \leq Z_o \leq 7T$, in order to achieve the aforementioned effect.

In the thermally assisted magnetic head of the present invention, as described above, the variation in the intensity of emerging light to irradiate the magnetic recording medium is kept small and the characteristic variation is reduced among products.

It is further preferable in terms of the aforementioned effect that a full width at half maximum (FWHM)=$2\times(0.34\times Z_o \tan(\alpha/2))^{1/2}$ of the light intensity distribution should satisfy the relation of FWHM>T.

As described above, when the light emitting point of the laser diode 40 is located far from the entrance of the waveguide (e.g., when Z is set in the range of 4 μm to 10 μm), variation in the integral intensity (total of quantity of incident light to the core 35) becomes small against mount position deviation in the X-direction. When 75% degradation is defined as a criterion, the permissible error can be increased to about ±2 μm where the distance Z is increased to 10 μm, whereas the mount permissible error is about ±1 μm where the distance Z is 4 μm. However, when the distance Z is increased from 4 μm to 10 μm, the intensity of the beam incident into the waveguide is reduced to half. Use of this technique allows us to significantly reduce the characteristic variation due to the mount position deviation.

FIG. 10 is a perspective view of the near-field light generator (plasmon probe) 36 as viewed from the medium-facing surface S.

The near-field light generator 36 is of a triangular shape when viewed from the medium-facing surface S, and is made of an electroconductive material. The base 36d of the triangle is arranged in parallel with the integration surface 2202 of the slider substrate 220 or in parallel with the track width direction, and the vertex 36c facing the base is arranged on the main magnetic pole layer 340 side of the electromagnetic coil element 34 with respect to the base 36d; specifically, the vertex 36c is arranged opposite to the leading edge E of the main magnetic pole layer 340. A preferred form of the near-field light generator 36 is an isosceles triangle whose two base angles at the two ends of the base 36d are equal to each other.

The radius r of curvature of the vertex 36c of the near-field light generator 36 is preferably 5-100 nm. The height H36 of the triangle is preferably sufficiently smaller than the wavelength of incident laser light and preferably 20-400 nm. The width W of the base 36d is preferably sufficiently smaller than the wavelength of incident laser light and preferably 20-400 nm. The angle β of the vertex 36c is, for example, 60°.

The thickness T36 of the near-field light generator 36 is preferably 10-100 nm.

When the near-field light generator 36 is disposed on the light exit face 353 of the core 35, the electric field is concentrated near the vertex 36c of the near-field light generator 36 and the near-field light is generated from near the vertex 36c toward the medium.

The near-field light generally has the maximum intensity at the border of the near-field light generator 36 when viewed from the medium-facing surface S, though it depends upon the wavelength of the incident laser light and the shape of the waveguide 35. Particularly, the present embodiment is so arranged that the electric field vector of the light arriving at the near-field light generator 36 is the stack direction (X-direction) of the laser diode 40. Therefore, radiation of the strongest near-field light occurs near the vertex 36c. Namely, the part facing the vicinity of this vertex 36c becomes a major heat-acting portion in the thermal assist action to heat a portion of the recording layer of the magnetic disk with light.

Since the electric field intensity of this near-field light is immeasurably stronger than that of the incident light, this very strong near-field light rapidly heats the opposed local part of the surface of the magnetic disk. This reduces the coercive force of this local part to a level allowing writing with the writing magnetic field, whereby writing with the electromagnetic coil element 34 becomes feasible even with use of the magnetic disk of a high coercive force for high-density recording. The near-field light penetrates to the depth of about 10-30 nm from the medium-facing surface S toward the surface of the magnetic disk. Therefore, under the present circumstances where the levitation amount is 10 nm or less, the near-field light can reach the recording layer part sufficiently. The width in the track width direction and the width in the medium moving direction of the near-field light generated in this manner are approximately equal to the aforementioned reach depth of the near-field light and the electric field intensity of this near-field light exponentially decreases with increase in the distance; therefore, the near-field light can heat the recording layer part of the magnetic disk in an extremely localized area.

Figure 11:
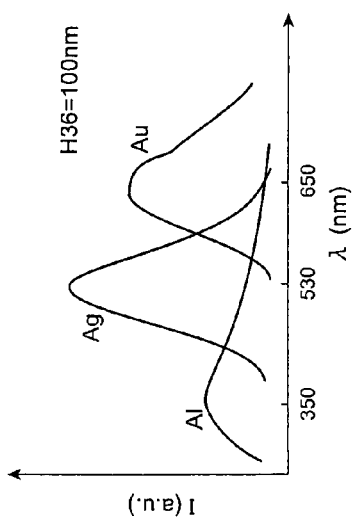
FIG. 11 is a graph showing the relationship of wavelength λ (nm) of incident light to the near-field light generator 36 against near-field light intensity I (a.u.).

FIG. 11 is a graph showing the relationship of wavelength λ (nm) of incident light to the near-field light generator 36 against intensity I (a.u.) of near-field light The length H36 of the near-field light generator 36 is set to H36=100 nm.

When Al is used as the near-field light generator 36, the intensity peak of near-field light appears near the wavelength λ (nm) of incident light of 350 nm; when Ag is used, the intensity peak appears near 530 nm; when Au is used, the intensity peak appears near 650 nm. The material of the near-field light generator 36 can also be Cu, Pd, Pt, Rh, or Ir, as well as Al, Ag, and Au. It is also possible to use an alloy consisting of a combination of two or more out of these metal materials, as the material of the near-field light generator 36.

Figure 12:
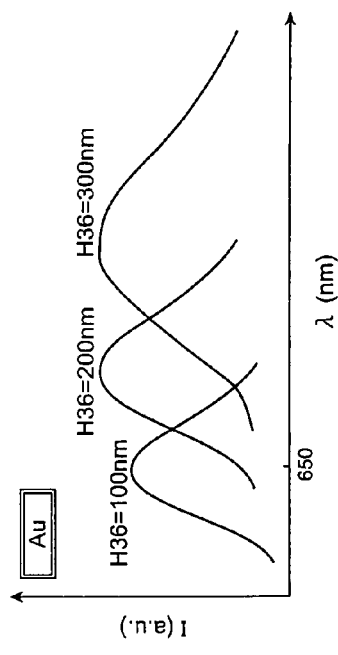
FIG. 12 is a graph showing tile relationship of wavelength λ (nm) of incident light to the near-field fight generator 36 against near-field light intensity I (a.u.).

FIG. 12 is a graph showing the relationship of wavelength λ (nm) of incident light to the near-field light generator 36 against intensity I (a.u.) of near-field light. The material of the near-field light generator 36 is Au, and the length H36 is 100 nm, 200 nm, or 300 nm. The length H36 is preferably 20-400 nm. The shorter the wavelength of the incident light, the narrower the full width at half maximum of the spectrum tends to be, and the higher the resistance of variation in the intensity of near-field light becomes against fluctuation of wavelength of incident light.

(Light Source Unit)

The components of the light source unit 23 in the thermally assisted magnetic head 21 will be described below again with reference to FIGS. 3 and 4.

The light source unit 23 mainly has a light source support substrate 230 and a laser diode (light emitting element) 40 whose contour is platelike.

The light source support substrate 230 is a substrate of AlTiC ($Al_2O_3$—TiC) or the like and has the bond surface 2300 bonded to the back surface 2201 of the slide substrate 220. A heat insulation layer 230a of alumina or the like is formed on the bond surface 2300. An insulating layer 41 of an insulating material such as alumina is disposed on an element forming surface 2302 being one side surface when the bond surface 2300 is regarded as a bottom surface. The electrode pads 47, 48 are formed on this insulating layer 41, and the laser diode 40 is fixed on the electrode pad 47.

The electrode pads 47, 48 are formed for driving of laser, on a surface 411 intersecting with the front surface of the insulating layer 41 and with the medium-facing surface S and, in other words, they are formed on the surface 411 parallel to the integration surface 2202 of the slider substrate 220.

The electrode pad 47, as shown in FIG. 4, is electrically connected through a via hole 47a provided in the insulating layer 41, to the light source support substrate 230. The electrode pad 47 also functions as a heat sink for leading heat during driving of the laser diode 40 through the via hole 47a to the light source support substrate 230 side.

The electrode pad 47, as shown in FIG. 3, is formed so as to extend in the track width direction in the central region of the surface 411 of the insulating layer 41. On the other hand, the electrode pad 48 is formed at a position separate in the track width direction from the electrode pad 47. Each of the electrode pads 47, 48 further extends toward the flexure 201 side, for connection with the flexure 201 by solder reflow.

The electrode pads 47, 48 are electrically connected to the electrode pads 247, 248 of the flexure 201, respectively, by reflow soldering, whereby the light source can be driven. Since the electrode pad 47 is electrically connected to the light source support substrate 230 as described above, the potential of the light source support substrate 230 can be controlled, for example, to the ground potential by the electrode pad 247.

The electrode pads 47, 48 can be comprised, for example, of layers of Au, Cu, or the like made in the thickness of about 1-3 μm and by vacuum evaporation, sputtering, or the like, which are formed, for example, through a ground layer of Ta, Ti, or the like about 10 nm thick The laser diode 40 is electrically connected onto the electrode pad 47 by a solder layer 42 (cf. FIG. 4) of an electrically conductive solder material such as Au—Sn. At this time, the laser diode 40 is located relative to the electrode pad 47 so as to cover only a part of the electrode pad 47.

Figure 13:
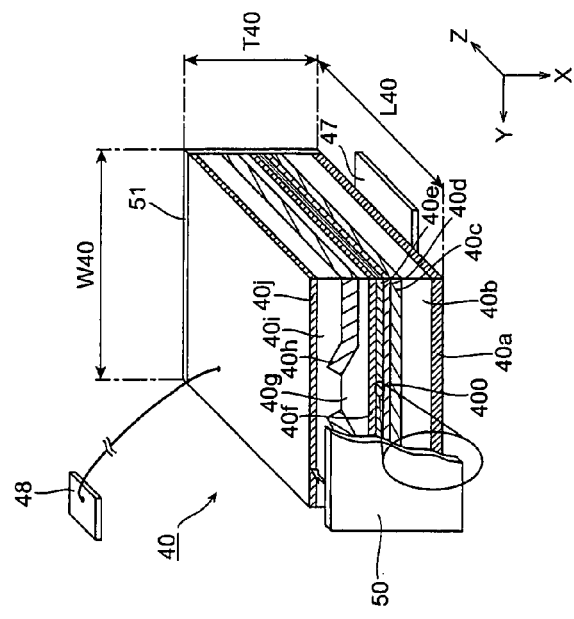
FIG. 13 is a perspective view of a laser diode 40.

FIG. 13 is a perspective view of the laser diode 40.

The laser diode 40 may have the same structure as the one normally used for an optical disk storage, and, for example, has a structure in which the following layers are stacked in order: an n-electrode 40a; an n-GaAs substrate 40b; an n-InGaAlP cladding layer 40c; a first InGaAlP guide layer 40d; an active layer 40e consisting of multiple quantum wells (InGaP/InGaAlP) or the like; a second InGaAlP guide layer 40f; a p-InGaAlP cladding layer 40g; an *n-GaAs current blocking layer 40h; a p-GaAs contact layer 40i; a p-electrode 40j. Reflecting films 50 and 51 of $SiO_2$, $Al_2O_3$, or the like for exciting oscillation by total reflection are deposited before and after cleavage faces of the multilayer structure, and an aperture is provided at the position of the active layer 40e in one reflecting film 50, at an output end 400 for emission of laser light. The laser diode 40 of this configuration emits laser light from the output end 400 when a voltage is applied thereto in the film thickness direction.

The wavelength $\lambda_L$ of the emitted laser light is, for example, approximately 600-650 nm. It should be, however, noted that there is an appropriate excitation wavelength according to the metal material of the near-field light generator 36. For example, in a case where Au is used for the near-field light generator 36, the wavelength $\lambda_L$ of the laser light is preferably near 600 nm.

The size of the laser diode 40 is, for example, the width (W40) of 200-350 μm, the length (depth L40) of 250-600 μm, and the thickness (T40) of about 60-200 μm, as described above. The width W40 of the laser diode 40 can be decreased, for example, to about 100 μm, while the minimum thereof is a spacing between opposed ends of the current blocking layer 40h. However, the length of the laser diode 40 is the quantity associated with the electric current density and thus cannot be decreased so much. In either case, the laser diode 40 is preferably dimensioned in a sufficient size, in consideration of handling during mounting.

A power supply in the hard disk drive can be used for driving of this laser diode 40. In practice, the hard disk drive is usually equipped, for example, with the power supply of about 2 V, which is a sufficient voltage for the lasing operation. The power consumption of the laser diode 40 is also, for example, approximately several ten mW, which the power supply in the hard disk drive can fully provide.

The n-electrode 40a of the laser diode 40 is fixed to the electrode pad 47 by the solder layer 42 such as AuSn (cf. FIG. 4). The laser diode 40 is fixed to the light source support substrate 230 so that the output end (light emission face) 400 of the laser diode 40 is directed downward (in the—Z-direction) in FIG. 4, i.e., so that the output end 400 becomes parallel to the bond surface 2300; whereby the output end 400 can face the light entrance face 354 of the waveguide 35 of the slider 22. In practical fixing of the laser diode 40, for example, an evaporated film of AuSn alloy is deposited in the thickness of about 0.7-1 μm on the surface of the electrode pad 47, the laser diode 40 is mounted thereon, and thereafter it is heated to be fixed, to about 200-300° C. by a hot plate or the like under a hot air blower.

The electrode pad 48 is electrically connected through a bonding wire to the p-electrode 40j of the laser diode 40. The electrode connected to the electrode pad 47 may also be the p-electrode 40j, instead of the n-electrode 40a, and in this case, the n-electrode 40a is connected through a bonding wire to the electrode pad 48.

In the case of soldering with the aforementioned AuSn alloy, the light source unit is heated, for example, to the high temperature of about 300° C., but according to the present invention, this light source unit 23 is produced separately from the slider 22; therefore, the magnetic head portion in the slider is prevented from being adversely affected by this high temperature.

The back surface 2201 of the aforementioned slider 22 and the bond surface 2300 of the light source unit 23 are bonded, for example, with an adhesive layer 44 such as a UV cure type adhesive (cf. FIG. 4) and the output end 400 of the laser diode 40 is arranged opposite to the light entrance face 354 of the waveguide 35.

The configurations of the laser diode 40 and the electrode pads do not always have to be limited to those in the above-described embodiment, of course, and, for example, the laser diode 40 may be one of another configuration using other semiconductor materials, such as GaAlAs type materials. Furthermore, it is also possible to use any other brazing material, for the soldering between the laser diode 40 and the electrode. Yet furthermore, the laser diode 40 may be formed directly on the unit substrate by epitaxially growing the semiconductor materials.

(Production Method)

Subsequently, a method of producing the thermally assisted magnetic head described above will be described below briefly.

First, the slider 22 is produced. Specifically, the slider substrate 220 is prepared, the MR effect element 33 and interelement shield layer 148 are formed by well-known methods, and the insulating layer 38 of alumina or the like is further formed as a ground layer.

Subsequently, the waveguide 35 and near-field light generator 36 are formed. This process will be described in detail with reference to FIGS.

FIGS. 14A to 14D and 15A to 15C are perspective views to illustrate an embodiment of the method of forming the waveguide 35 and the near-field light generator 36.

Figure 14A:
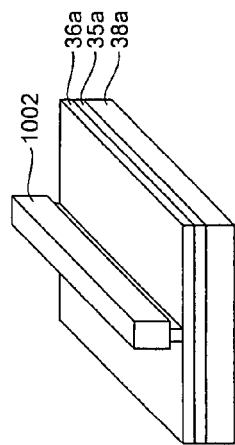
FIGS. 14A, 14B, 14C and 14D are perspective views for explaining an embodiment of a method of forming the waveguide 35 and near-field light generator 36.

In the first step, as shown in FIG. 14A, a dielectric film 35a of $Ta_2O_5$ or the like with the refractive index higher than that of the insulating layer 38a, which will be a part of the waveguide 35, is first deposited on the insulating layer 38a of $Al_2O_3$ or the like, a metal layer 36a of Au or the like is then deposited thereon, and a resist pattern 1002 depressed for liftoff in the bottom part is formed thereon.

Figure 14B:
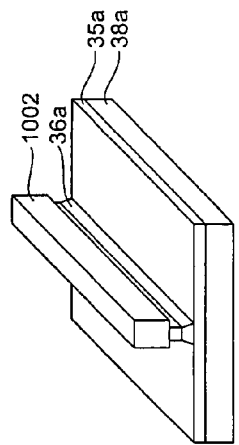

In the next step, as shown in FIG. 14B, unnecessary portions of the metal layer 36a are removed except immediately below the resist pattern 1002 by ion milling or the like, thereby forming a pattern of the metal layer 36a of a trapezoid shape wider in the bottom as deposited on the dielectric film 35a.

Figure 14C:
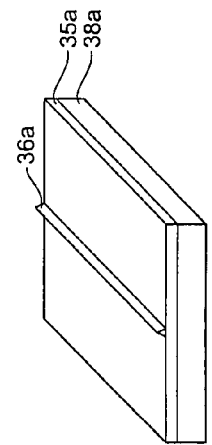

In the subsequent step, as shown in FIG. 14C, the resist pattern 1002 is removed, and a part of each slope is removed from the two slope sides of the metal layer 36a of the trapezoid shape by ion milling or the like, to form the metal layer 36a in a triangular sectional shape.

Figure 14D:
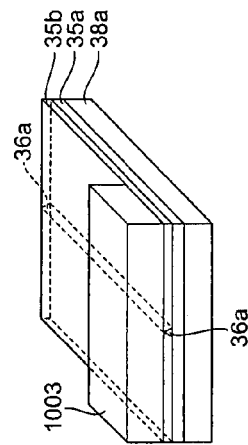

Subsequently, as shown in FIG. 14D, a dielectric film 35b of the same material as the dielectric film 35a is deposited on the dielectric film 35a so as to cover the metal layer 36a, a resist pattern 1003 for formation of the end face of the metal layer 36a is laid on the side where the medium-facing surface will be formed, the metal layer 36a and the dielectric film 35b are removed by ion milling or the like, from the side opposite to the side where the medium-facing surface will be formed, as shown in FIG. 15A, and thereafter a dielectric film 35c of the same material as the dielectric film 35b is deposited on the removed portion.

Furthermore, as shown in FIG. 15B, a dielectric film 35d of the same material as the dielectric film 35b is further deposited on the dielectric films 35b, 35c, and the dielectric films 35a, 35b, 35c, 35d are patterned so as to achieve a predetermined width, thereby almost completing the waveguide 35.

Thereafter, as shown in FIG. 15C, an insulating layer 38b of the same material as the insulating layer 38a is further formed so as to cover the waveguide 35, thereby completing the insulating layer 38 as a cladding layer. Then lapping is performed by a predetermined distance from the side where the metal layer 36a is exposed, as described later, to form the near-field light generator 36 of the predetermined thickness and the medium-facing surface S.

The above steps can form the waveguide 35 with the near-field light generator 36 therein.

After that, the electromagnetic coil element 34 is formed by the well-known method as shown in FIG. 4, and then the insulating layer 38 of alumina or the like is formed. Furthermore, the electrode pads 371 and others for connection are formed and thereafter lapping of the air bearing surface and the back surface thereof is performed to complete the slider 22. After this step, tests of the electromagnetic coil element 34 and the MR effect element 33 of slider 22 are conducted for each slider, to select a nondefective product.

Subsequently, the light source unit 23 is produced. In the first step, as shown in FIG. 4, the light source support substrate 230 of AlTiC or the like is prepared, the heat insulation layer 230a, insulating layer 41, and electrode pads 47, 48 are formed on the surfaces of the substrate by well-known methods, the laser diode 40 is fixed on the electrode pad 47 by an electrically conductive solder material such as AuSn, and thereafter the substrate is shaped into a predetermined size by separation by cutting or the like. This completes the light source unit 23. The light source unit obtained in this manner is also subjected to characteristic evaluation of the laser diode, particularly, observation of a profile of drive current by a high-temperature continuous conduction test, to select one considered to have a sufficiently long life.

After that, as shown in FIG. 16A, a UV cure type adhesive 44a is applied onto either or both of the bond surface 2300 of the light source unit 23 as a nondefective unit and the back surface 2201 of the slider 22 as a nondefective unit The UV cure type adhesive can be a UV cure type epoxy resin, a UV cure type acrylic resin, or the like.

Then, as shown in FIG. 16B, the bond surface 2300 of the light source unit 23 and the back surface 2201 of the slider 22 are laid on each other, and then the laser diode 40 is activated with application of a voltage between the electrode pads 47, 48, and a photodetector DT is opposed to the light exit face 353 of the waveguide 35. The light source unit 23 and the slider 22 are relatively moved in directions of arrows in FIG. 16B to find out a position where the output from the photodetector DT becomes maximum. At that position, UV light is applied from the outside onto the UV cure type adhesive to cure the UV cure typo adhesive 44a, which can bond the light source unit 23 and the slider 22 to each other in a state in which the optical axis of the laser diode is aligned with the optical axis of the waveguide 35.

Subsequently, the action of the thermally assisted magnetic head 21 according to the present embodiment will be described below.

During a writing or reading operation, the thermally assisted magnetic head 21 hydromechanically floats up by a predetermined levitation amount above the surface of the rotating magnetic disk (medium) 10. On this occasion, the ends on the medium-facing surface S side of the MR effect element 33 and the electromagnetic coil element 34 are opposed through a small spacing to the magnetic disk 10, thereby implementing readout by sensing of a data signal magnetic field and writing by application of a data signal magnetic field.

On the occasion of writing of a data signal, the laser light having propagated from the light source unit 23 through the core 35 reaches the near-field light generator 36, whereupon the near-field light generator 36 generates the near-field light. This near-field light enables execution of the thermally assisted magnetic recording.

By adopting the thermally assisted magnetic recording, it also becomes feasible to achieve, for example, the recording density of 1 Tbits/in$^2$ order, by performing writing on the magnetic disk of a high coercive force by means of the thin film magnetic head for perpendicular magnetic recording to record recording bits in an extremely fine size.

The present embodiment uses the light source unit 23, so that the laser light propagating in the direction parallel to the layer surface of the core 35 can be made incident to the light entrance face (end face) 354 of the core 35 of the slider 22. Namely, the laser light of appropriate size and direction can be surely supplied in the thermally assisted magnetic head 21 having the configuration in which the integration surface 2202 and the medium-facing surface S are perpendicular to each other. As a result, it is feasible to implement the thermally assisted magnetic recording with high heating efficiency of the recording layer of the magnetic disk.

Since in the present embodiment the magnetic head portion 32 is fixed to the slider substrate 220 and the laser diode 40 as the light source is separately fixed to the light source support substrate 230, the thermally assisted magnetic head 21 as a nondefective product can be produced with a good yield by individually testing each of the electromagnetic coil element 34 fixed to the slider substrate 220 and the laser diode 40 fixed to the light source support substrate 230, and thereafter fixing the slider 22 as a nondefective unit and the light source unit 23 as a nondefective unit to each other.

Since the magnetic head portion 32 is disposed on the side surface of the slider substrate 220, the electromagnetic coil element 34, the MR effect element 33, and others of the magnetic head portion 32 can be readily formed by the production methods of the conventional thin film magnetic heads.

Furthermore, since the laser diode 40 is located at the position apart from the medium-facing surface S and near the slider 22, it is feasible to suppress the adverse effect of the heat generated from the laser diode 40, on the electromagnetic coil element 34, the MR effect element 33, etc., and the possibilities of contact or the like between the laser diode 40 and the magnetic disk 10, to reduce the propagation loss of light because of the dispensability of an optical fiber, a lens, a mirror, etc., and to simplify the structure of the entire magnetic recording apparatus.

Since in the present embodiment the heat insulation layer 230a is formed on the back surface of the light source support substrate 230, the heat generated from the laser diode 40 is less likely to be transferred to the slider 22.

In the above embodiment the slider substrate 220 and the light source support substrate 230 were the substrates of the same material of AlTiC, but it is also possible to use substrates of different materials. In this case, where the thermal conductivity of the slider substrate 220 is $\lambda s$ and the thermal conductivity of the light source support substrate 230 is $\lambda l$, they are preferably selected to satisfy $\lambda s \leq \lambda l$. This facilitates the transfer of the heat generated by the laser diode 40, through the light source support substrate 230 to the outside while minimizing the transfer of the heat to the slider substrate 220.

The sizes of the slider 22 and the light source unit 23 are arbitrary, but the slider 22 may be, for example, a so-called femtoslider having the width of 700 μm in the track width direction×length (depth) of 850 μm×thickness of 230 μm. In this case, the light source unit 23 can have the width and length approximately equal to them. In fact, the typical size of the ordinary laser diode is approximately the width of 250 μm×length (depth) of 350 μm×thickness of 65 μm, and the laser diode 40 of this size can be adequately mounted, for example, on the side surface of the light source support substrate 230 of this size. It is also possible to make a groove in the bottom surface of the light source support substrate 230 and locate the laser diode 40 in this groove.

The spot of the far field pattern (the far field pattern) of the laser light reaching the light entrance face 354 of the waveguide 35 can be made in the size in the track width direction, for example, of about 0.5-1.0 μm and the size perpendicular to the foregoing size, for example, of about 1-5 μm. In correspondence thereto, the thickness T35 of the waveguide 35 receiving this laser light is preferably, for example, about 2-10 μm so as to be larger than the spot and the width (W35) in the track width direction of the waveguide 35 is preferably, for example, about 1-200 μm.

The electromagnetic coil element 34 may be one for longitudinal magnetic recording. In this case, a lower magnetic pole layer and an upper magnetic pole layer are provided instead of the main magnetic pole layer 340 and the auxiliary magnetic pole layer 344, and a writing gap layer is interposed between the ends on the medium-facing surface S side of the lower magnetic pole layer and the upper magnetic pole layer. Writing is implemented by a leakage magnetic field from the position of this writing gap layer.

The shape of the near-field light generator is not limited to the one described above, either, and it can also be, for example, a trapezoid shape resulting from truncation of the vertex 36c, instead of the triangular shape. It is also possible to adopt a so-called "bow tie type" structure in which a pair of sheets of a triangular shape or a trapezoidal shape are opposed to each other with their vertices or shorter sides being spaced by a predetermined distance.

Figure 17:
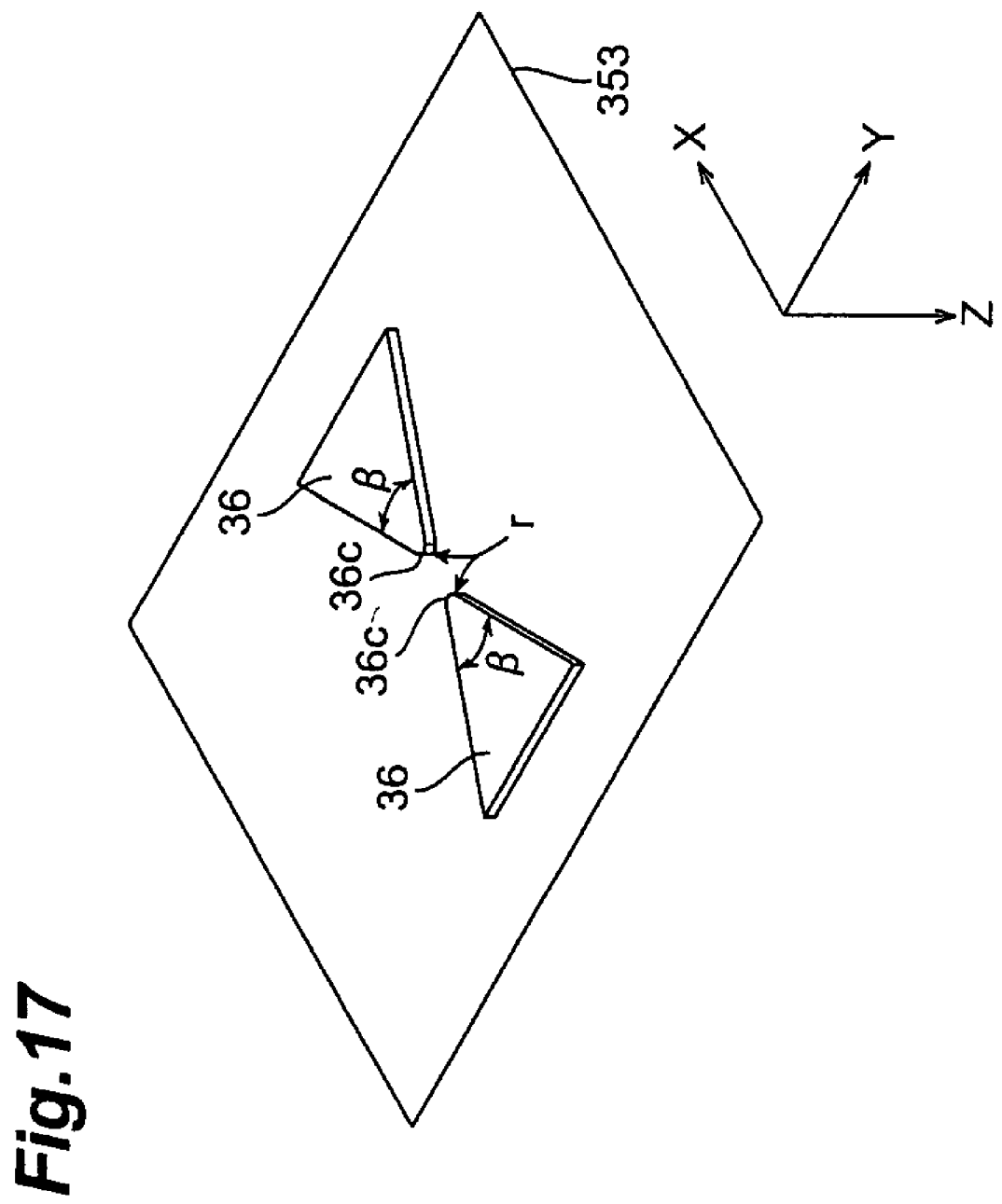
FIG. 17 is a perspective view of near-field generators 36 of "bow tie type" structure.

FIG. 17 is a perspective view of near-field light generators 36 of the "bow tie type" structure. A pair of near-field light generators are arranged opposite to each other along the X-axis and their vertices 36c are opposed to each other with a predetermined spacing in between. In this "bow tie type" structure, a very strong electric field is concentrated in the central region between the vertices 36c to generate near-field light.

The coil layer 342 is one layer in FIG. 4 and others, but it may be two or more layers, or a helical coil.

In another embodiment, the near-field light generator 36 may be a small aperture smaller than the wavelength of light, disposed on the medium-facing surface S side of the core 35.

The heat insulation layer 230a may be formed on the back surface 2201 of the slider substrate 220, and the present invention can also be carried out without the heat insulation layer.

The bonding between the light source unit 23 and the slider 22 can also be implemented with any adhesive other than the TV cure type adhesive, e.g., with a solder layer of AuSn or the like which was used in the bonding between the laser diode 40 and the electrode pad 47.

In the above-described example the linear waveguide was used as the shape of the core 35, but it may also be a parabolic waveguide whose contour in the YZ plane is a parabola, while the near-field light generator is located at the position of its focus. The contour in the YZ plane may be an elliptical or other shape. The above-described HGA and hard disk drive with the thermally assisted magnetic head are able to reduce the characteristic variation among products.

It should be noted that the above-described embodiments all were described as illustrative of the present invention but not restrictive of the invention, and that the present invention can also be carried out in a variety of other modification and change forms. Therefore, the scope of the present invention should be defined by the scope of claims and scope of equivalents thereof only.

What is claimed is:

1. A thermally assisted magnetic head comprising:
  a slider substrate having a medium-facing surface, a first surface located opposite to the medium-facing surface, and side surfaces located between the medium-facing surface and the first surface;
  a magnetic head portion having a core of a planar waveguide with a light exit face on the medium-facing surface side, and a magnetic recording element located in proximity to the light exit face, the magnetic head portion being fixed to one of the side surfaces;
  a light source support substrate having a second surface fixed to the first surface; and
  a light emitting element opposed to an exposed light entrance face of the core and fixed to the light source support substrate;
  wherein, where a thickness direction, a width direction, and a longitudinal direction of the core are defined as an X-axis, a Y-axis, and a Z-axis, respectively,
  where $\alpha$ is defined as a beam angle in the XY plane of a far field pattern of light emitted from the light emitting element, where $Z_o$ is defined as a distance between a center of the light entrance face and a light emitting surface of the light emitting element, and where T is defined as a thickness of the core, the light emitted along the Z-axis from the light emitting element is incident to the exposed light entrance face, and a spot size $w=2 \times Z_o \tan(\alpha/2)$ of a light intensity distribution along the X-axis in the XY plane including an incident-light centroid position on the exposed light entrance face is larger than the thickness T at the exposed light entrance face of the core.

2. The thermally assisted magnetic head according to claim 1, further comprising a plasmon probe disposed on the light exit face of the core.

3. The thermally assisted magnetic head according to claim 1, comprising:

a cladding disposed around the core; and a metal kept in contact with the cladding.

4. The thermally assisted magnetic head according to claim 1, further comprising:

a cladding disposed around the core;

wherein the magnetic recording element comprises:

a helical coil of a metal kept in contact with the cladding and adapted to generate a writing magnetic field; and a main magnetic pole layer extending from a helical center of the coil toward the medium-facing surface.

5. The thermally assisted magnetic head according to claim 1, wherein the light entrance face is inclined relative to the XY plane.

6. A head gimbal assembly comprising:

the thermally assisted magnetic head as defined in claim 1; and a suspension supporting the thermally assisted magnetic head.

7. A hard disk drive comprising:

the head gimbal assembly as defined in claim 6; and a magnetic recording medium opposed to the head gimbal assembly.

* * * * *